J. L. POPE.
PULLEY-BLOCK.

No. 191,814.

Patented June 12, 1877.

UNITED STATES PATENT OFFICE.

JOHN L. POPE, OF CLEVELAND, OHIO.

IMPROVEMENT IN PULLEY-BLOCKS.

Specification forming part of Letters Patent No. 191,814, dated June 12, 1877; application filed April 23, 1877.

*To all whom it may concern:*

Be it known that I, JOHN L. POPE, of Cleveland, in the county of Cuyahoga and State of Ohio, have invented new and useful Improvements in Pulley-Blocks, of which the following is a specification, reference being had to the accompanying drawings, making a part thereof, in which—

Figure 1:
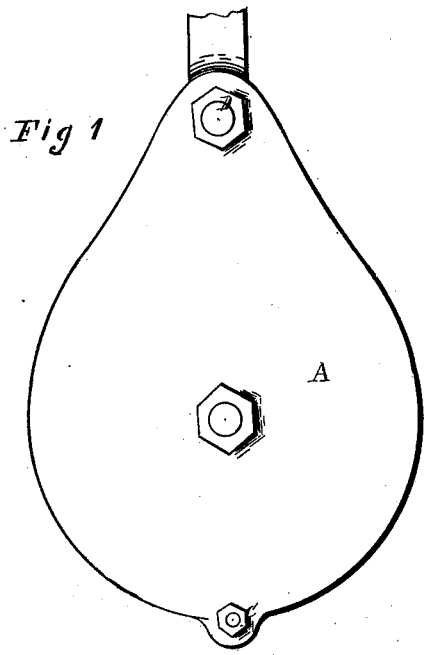
Figure 2:
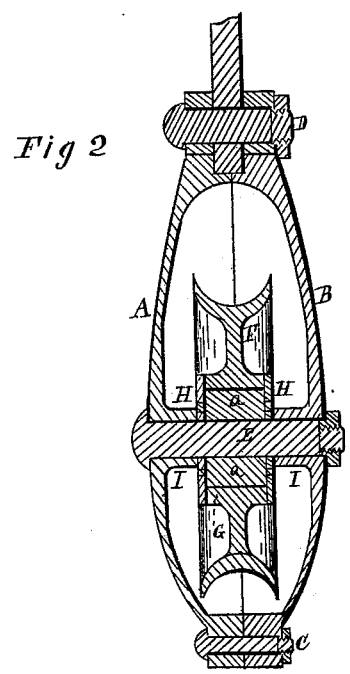
Figure 3:
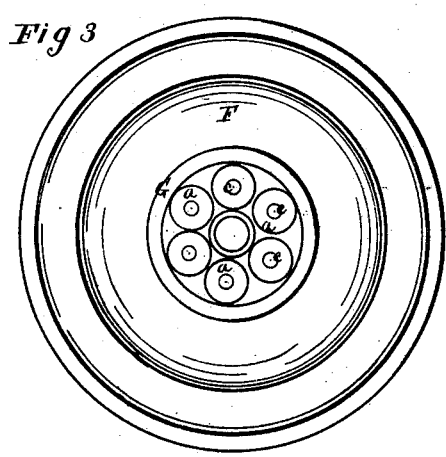
Figure 4:
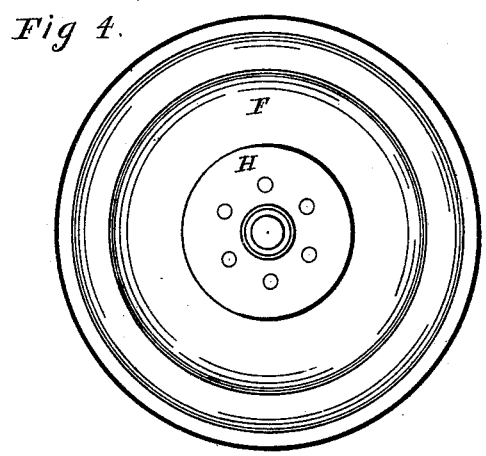

Figure 1 is a side view of a pulley-block. Fig. 2 is a transverse section. Figs. 3 and 4 are detached views of the sheave with roller-bushing.

Like letters of reference refer to like parts in the several views presented.

The nature of this invention relates to roller-bushing for pulley-blocks, whereby the lateral strain or pressure exerted on the sheave is received on certain washers interposed between the ends of the hub of the sheave and bosses on the cheeks or shells of the block, as hereinafter described. The shell of said block consists of two sections or cheeks, A B, each of which is convex on the outer side and concave on the inner side. The sections are secured to each other by bolts C D, and by the shaft E, whereon the sheave F runs. Within the hub G of the sheave, and surrounding the shaft, is a series of rollers, *a*, Fig. 2, an end view of which is shown in Fig. 3, wherein E is the shaft, and *a* the rollers. Said rollers are in length just equal to the thickness or length of the hub, and which are retained therein around the shaft by washers H, Fig. 2 and 4, in which the pivots *c* of the rollers have their bearing, and whereby the rollers are kept from running upon each other.

The thickness of the hub, together with the interposed washers, fills the space between the bosses I of the cheeks, as seen in Fig. 2, in which I are the bosses against which the washers rest. The washers are free to rotate with the sheave, together with the rollers pivoted therein. The rollers, however, have an independent axial movement as they revolve with the washers around the shaft.

The purpose in placing the washers between the hub of the sheave and the ends of the bosses is to provide the hub with a broad firm bearing-surface, so that the washers may effectually resist the lateral strain to which the sheave may be subjected. The necessity of this lateral support to the sheave by means of the washers is due to the enlarged size of the hub for the accommodation of the rollers, together with the concave form of the shells and the small size of the bosses.

The bosses could be made larger in diameter, but that is objectionable, as it would add to the weight and cost of the block. The washers, as before said, being free to rotate, the sheave will run with less friction than it would were the bosses and the hub of equal diameters.

What I claim as my invention, and desire to secure by Letters Patent, is—

1. In combination with the sheave F, rollers *a*, and cheek-pieces A and B of the block, the washers H, bearing on the hub G of the sheave, substantially as described, and for the purpose specified.

2. In tackle-blocks having roller-bushed sheaves, the interposed washers H, in combination with a hub larger than the bosses, for receiving the lateral strain or pressure, substantially as herein set forth.

JOHN L. POPE.

Witnesses:
J. H. BURRIDGE,
S. H. GORDEN.